United States Patent [19]
Janzen et al.

[11] Patent Number: 5,788,054
[45] Date of Patent: Aug. 4, 1998

[54] DEVICE FOR UNTANGLING CROSSED HANGER HOOKS

[75] Inventors: Paul Janzen; Klaus Niesen, both of Bielefeld, Germany

[73] Assignee: Dürkopp Adler AG, Bielefeld, Germany

[21] Appl. No.: 629,234

[22] Filed: Apr. 8, 1996

[30] Foreign Application Priority Data

Apr. 20, 1995 [DE] Germany ............ 195 14 604.2

[51] Int. Cl.$^6$ .................................................. B65G 47/26
[52] U.S. Cl. ............................... 198/459.3; 198/465.4
[58] Field of Search ........................... 198/459.3, 465.4, 198/680

[56] References Cited

U.S. PATENT DOCUMENTS

| | | | |
|---|---|---|---|
| 2,947,407 | 8/1960 | Wood | 198/465.4 X |
| 3,207,262 | 9/1965 | Berman | 198/465.4 X |
| 5,305,896 | 4/1994 | Branch | 198/459.3 X |

FOREIGN PATENT DOCUMENTS

| | | |
|---|---|---|
| 0346991 | 12/1989 | European Pat. Off. . |
| WO9303985 | 3/1993 | WIPO . |

OTHER PUBLICATIONS

Patent Abstracts of Japan, M681, vol. 12, Apr. 6, 1988, No. 100.

Primary Examiner—Janice L. Krizek
Attorney, Agent, or Firm—Ostrolenk, Faber, Gerb & Soffen, LLP

[57] ABSTRACT

A device for untangling crossed hooks of a conveyed material transported hanging on hangers or the like. The hooks grip around, and are transported by, a rotating, substantially cylindrical hollow body. The untangling device is directed radially outward from the body to engage between two hooks. The untangling device includes a plurality of mutually parallel pins that are mounted resiliently within the hollow body and extend through slots in the hollow body.

27 Claims, 5 Drawing Sheets

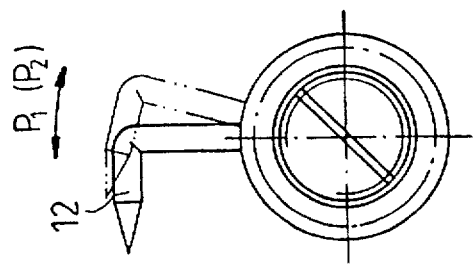
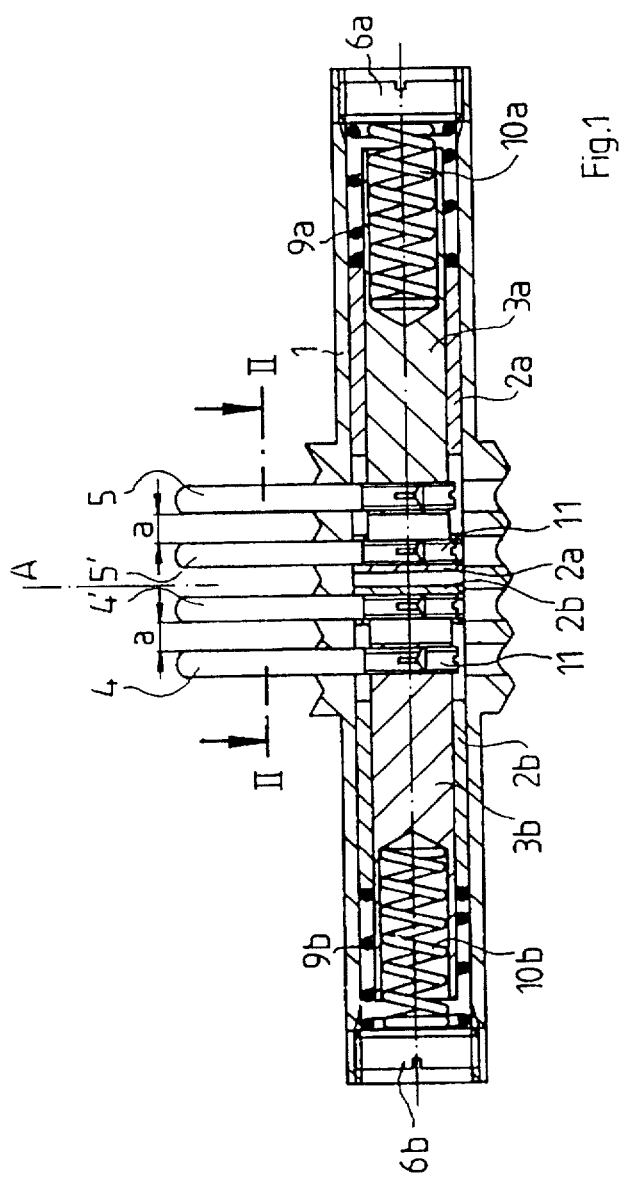
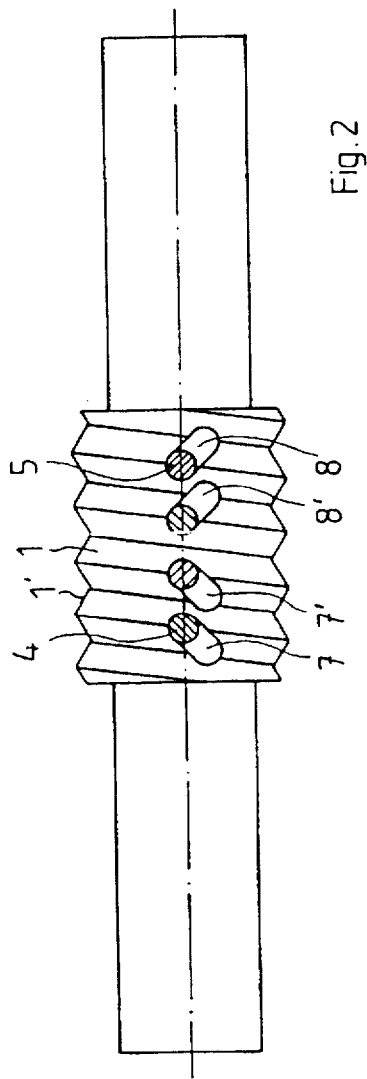

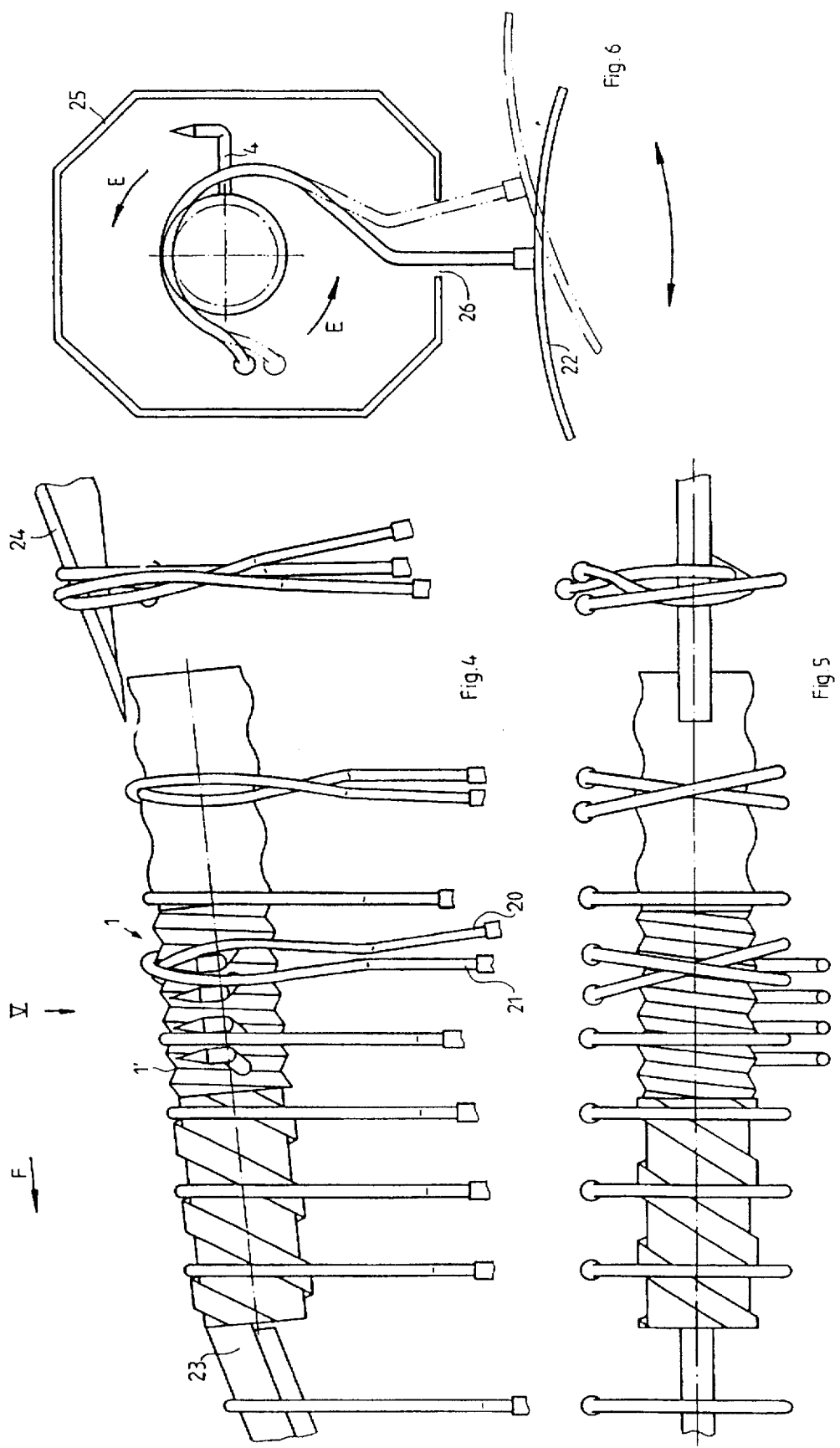

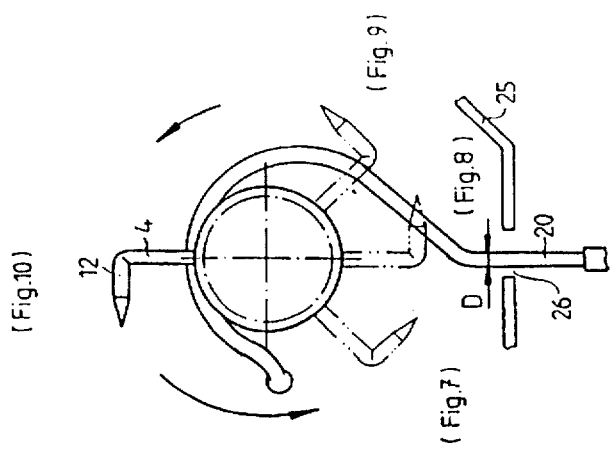
Fig.11
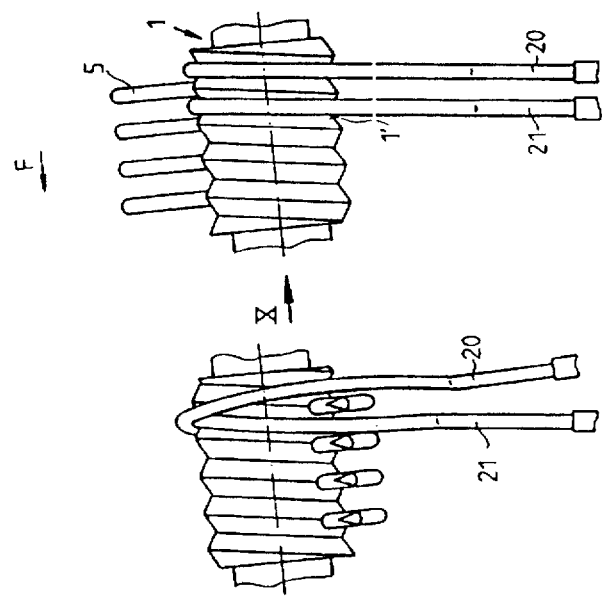
Fig.10
Fig.9
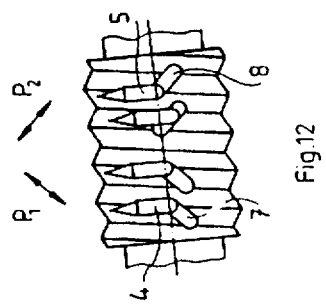
Fig.12
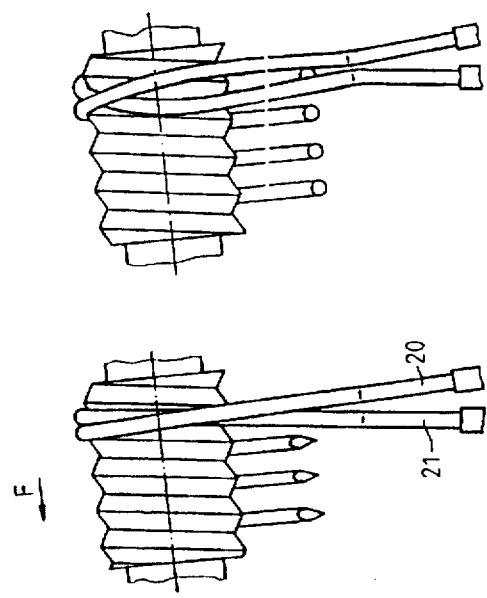
Fig.8
Fig.7

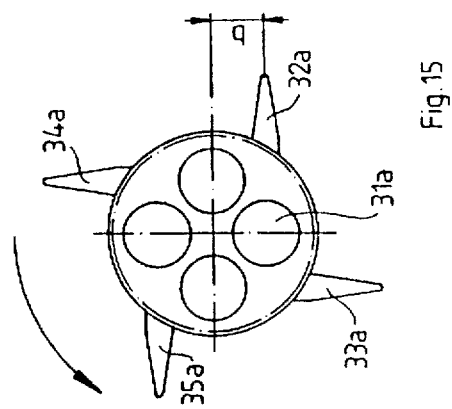
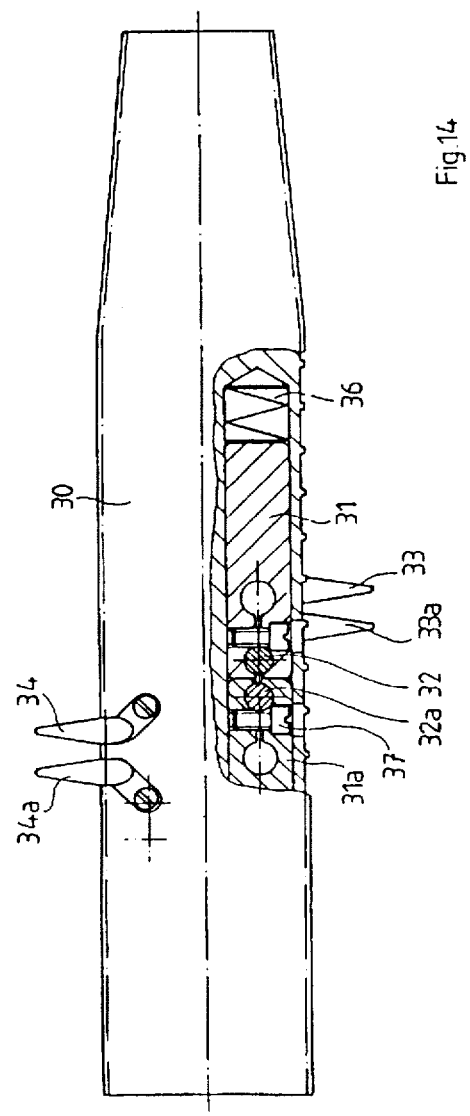

DEVICE FOR UNTANGLING CROSSED HANGER HOOKS

BACKGROUND OF THE INVENTION

1. Field of the Invention:

The present invention relates to a device for untangling crossed hooks, and more specifically, crossed hooks of hangers used to convey material that hangs on hangers, such as clothing or the like. The hooks grip around, and are transported by, a rotating, substantially cylindrical, at least partially hollow body. An untangling device that engages between two hooks is directed radially-outward from the body.

2. Description of the Related Art:

Hanging conveyor systems are used to transport articles hanging on hangers. These systems are used with clothes, as an example, for sorting or for sale on consignment. During transportation, the hooks of hangers that are arranged one behind the other often cross over each other. As a result, two or more hanger hooks become crossed, that is, they become arranged one above the other.

Crossed hooks lead to various problems. For example, during automatic sorting or consigning, crossed hangers are difficult to grasp or engage automatically and individually. Individual removal of hangers from the conveyor also presupposes that hanger hooks are not crossed. Also, an automatic counting device will not, as a general rule, recognize crossed hanger hooks as being several hooks. As a result, crossed hangers usually are counted incorrectly as only one hook.

A known untangling device is disclosed in WO 93/03985. The hanger hooks are guided onto a rotating pipe. The pipe has a separating knife arm directed radially-outward from the pipe. Two separating fingers are arranged below the rotating pipe. The separating fingers are driven back and forth independently of each other. The separating fingers are actuated alternately and are arranged parallel to and sufficiently close to each other that only one hanger-hook neck fits between each pair of separating fingers.

By suitable control of the separating fingers in the known device, two hanger hooks that are crossed one over the other are positioned. The separating knife arm rotates with the pipe and engages between the hanger hooks to lift the upper hanger hook over the lower one, whereby the hooks are separated. By suitable control of the separating fingers, the two separated hangers are transported further along the conveyor system.

The known device described above is disadvantageous in part because operability is assured only as long as not more than two hanger hooks are crossed. Furthermore, control of the separating fingers frequently is complicated because further transportation of the rear hanger hook normally is possible only when the separating knife arm is located at the bottom, that is, in the open region below the curvature of the hanger hook.

EP 0 346 991 discloses another known untangling device for hooks of hangers that are conveyed on a spindle. The untangling device is formed by disk-shaped separating elements that are fastened on the spindle. The separating elements are made from a single, helical disk, and effectively provide two separating fingers diametrically opposed to a single separating finger. The pitch of the spiral disk is such that the width of the opening between the two separating fingers corresponds approximately to the diameter of the wire of the hanger hook, so that in all cases only one hanger hook can be gripped by the untangling device.

JP 62-235 120 (A) discloses a known belt-untangling device in which hooks are distributed over the circumference of a spindle. The hooks are spaced apart in an axial direction, and engage between individual belts to separate them.

In view of the problems and drawbacks discussed above, the need exists for a simpler untangling device that improves upon the known devices and provides a system whereby multiple crossed hanger hooks can be untangled.

SUMMARY OF THE INVENTION

The present invention improves over the known devices by providing an untangling device having a plurality of pins arranged in parallel planes. The pins are mounted resiliently within a body so as to protrude from the body through slots. According to the present invention, it is possible to untangle more than two hanger hooks that are crossed with each other.

Further, due to the parallel arrangement of the pins, several untangling processes can be carried out one after the other. Instead of a fixed cycle, a continuous course of movement in the untangling device is possible. Untangling is independent of the time sequence of approaching hangers. Hanger hooks that are not crossed can also be transported through the untangling device.

The resiliently-mounted pins provide flexibility that allows the untangling device to operate in a manner similar to that of a comb. Further, the resilient mounting reliably avoids forceful impacts between the untangling device and the hangers. As a result, the amount of noise produced is reduced, and hanger hooks that have been struck by the untangling pins are prevented from being knocked out of the device.

According to a preferred embodiment, the pins are fastened on a rotatable shaft. The rotatable shaft is mounted so as to be axially displaceable within the hollow body. More preferably, each pin is fastened to a separate shaft. A particularly compact arrangement can be obtained if at least some of shafts are hollow, and the individual shafts are inserted one within the other.

Further, pairs of shafts preferably are arranged symmetrically so as to form mirror images with respect to a radial line through the hollow body, and the axial movement of the individual shaft arrangements is mutually opposed. As a result, the pins move in mutually opposite directions, providing movement and flexibility that allows evasion of forceful and potentially damaging or disruptive impacts during untangling of various crossed-hanger situations, including hangers that have become securely entangled.

In a further preferred embodiment of the present invention, four pins are provided, one on each of two hollow shafts and two solid shafts. Each solid shaft travels within a hollow shaft. In this way, minimal space is required for construction of the device. The pins preferably are fastened screws in the shafts.

Furthermore, the pins preferably have a bent tip. Using the bent tips, the hanger hooks can be engaged and separated reliably from below, and downward sliding of the upper hanger over the pin upon lifting out of the upper hanger is prevented.

Advantageously, the distance between two pins corresponds approximately to the diameter of a hanger hook, so that in all cases only one hook is reliably guided.

The pins preferably are arranged axially along the body, and are spaced radially from each other. For each pin, a combined axial and radial movement can be carried out. In this way, a particularly quiet and uniform separating of the hanger hooks is possible.

In another preferred embodiment, the pins are in each case mounted in an axially-flexible bolt, at least four bolts being provided within the hollow body. In this way, construction within the hollow body is simplified.

Preferably, flexibility of the pin mounting is such that the pins return reliably to their original position after deflection. Pin mobility can be adjusted in accordance with the properties of the mounting material chosen. The pins preferably are cast in the hollow body in an elastic compound, for example rubber or the like.

Furthermore, the pins preferably are spaced apart radially by 90°. Further, according to a preferred embodiment, it is advantageous if the pins are so arranged that their central axis (longitudinal axis) extends parallel to a radial line.

The body preferably is a spindle which engages a shaft at either end. In addition, the body preferably has screw threads formed along its outer surface in which the hanger hooks can rest and travel.

Other features and advantages of the present invention will become apparent from the following description of the invention which refers to the accompanying drawings.

BRIEF DESCRIPTION OF THE DRAWINGS

FIG. 1 is an axial section through the device according to a preferred embodiment of the present invention;

FIG. 2 is a cross section along the line II—II of FIG. 1;

FIG. 3 is a side view of the device shown in FIG. 1;

FIG. 4 is a side view of the device according to a preferred embodiment of the present invention with hanger hooks being transported thereon;

FIG. 5 is a top view seen in the direction of the arrow V in FIG. 4;

FIG. 6 is a side view of the device according to a preferred embodiment of the present invention;

FIGS. 7 to 10 show the untangling process in a chronological sequence according to a preferred embodiment of the present invention;

FIG. 11 is a diagrammatic illustration of the positions of the pins according to a preferred embodiment of the present invention, each position corresponding to a time in accordance with FIGS. 7 to 10, as indicated, seen in the direction of the arrow X;

FIG. 12 is a view seen in the direction of the arrow XII in FIG. 8;

FIG. 14 shows a further alternative embodiment of the present invention;

FIG. 15 is a view as seen in the direction of arrow XV in FIG. 14.

DETAILED DESCRIPTION OF THE PREFERRED EMBODIMENTS

Figure 13:
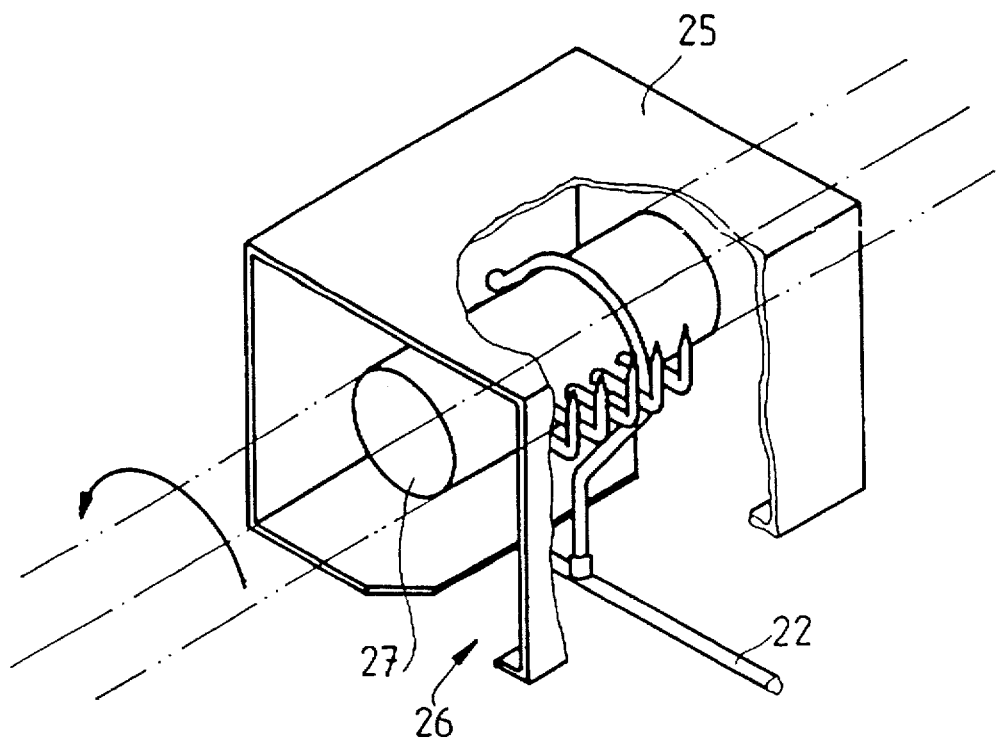
FIG. 13 shows an alternative embodiment of the present invention.

Referring first to FIG. 1, an untangling device according to a preferred embodiment of the present invention includes a hollow spindle 1 and shafts 2a, 2b; 3a, 3b arranged therein. Pins 4, 4', 5, 5' are each mounted to one of the shafts. Slots 7, 7', 8, 8', formed in spindle 1, are arranged tangentially and extend along an oblique angle with respect to a central axis of spindle 1. The angular direction of slots 7, 7', shown on the left in FIG. 2, is opposite to that of slots 8, 8' arranged as shown on the right. Pins 4, 4', 5, 5' extend outward radially from inside spindle 1 through slots 7, 7', 8, 8'.

Pins 4', 5' are fastened by screws 11 to shafts 2a, 2b. Shafts 2a, 2b, are hollow and receive solid shafts 3a, 3b. Pins 4, 5 are fastened within shafts 3a, 3b also by further screws 11.

Along the radial line of symmetry A shown in FIG. 1, shafts 2a, 3a are arranged as mirror images of shafts 2b, 3b. Shafts 2a, 2b, and 3a, 3b are mounted for axial displacement and rest against compression springs 9a, 9b and 10a, 10b, respectively. Pressure screws 6a, 6b can be screwed into spindle 1, whereby springs 9a, 10a; 9b, 10b are tensioned respectively; thus, the force required to deflect pins 4, 4'; 5, 5' can be established or adjusted. By the mirror-image arrangement of shafts 2a, 3a; 2b, 3b pins 4, 4'; 5, 5' can move in an oppositely-directed fashion in slots 7, 7'; 8, 8' as depicted by the arrows $P_1$, $P_2$ (FIG. 12).

Operation of the device will be explained with reference to FIGS. 4 to 12 as follows:

A chute 24 is arranged with an inclined slope, whereby clothing hanger hooks pass onto spindle 1. As shown in the figures, individual hangers are crossed over each other. Spindle 1 turns around its central axis as indicated by arrows E (FIG. 6). Accordingly, hanger hooks—two of which, for instance, being designated 20, 21—are transported in the direction of conveyance F (FIG. 4).

Hangers come into threads 1' of spindle 1. Individual uncrossed hangers are transported unimpeded past pins 4, 4', 5, 5'. Hangers that are crossed over each other are engaged by the first pin 5. The pins move such that bent tip 12 of pin 5 is inserted between the two hanger hooks 20, 21. Pin 5 continues along its rotational path to lift up, and then release, the upper hook 20. As soon as hanger hooks 20, 21 have been untangled, they travel unimpeded past the following pins 5', 4', 4.

If more than two hanger hooks are crossed so as to lie one above the other, the front hanger hook 20 in the direction of transport F is engaged first by pin 5 and lifted. The next pin 5' then engages the following hanger hook, etc. If the hanger hooks are too strongly entangled, pins 4, 4', 5, 5' can move away as indicated by the arrows $P_1$, $P_2$ (FIG. 12).

FIG. 7 shows how pin 5 moves, with spindle 1 turning in the direction of the superimposed hanger hooks 20, 21. FIG. 8 illustrates how pin 5 enters via tip 12 between the necks of hanger hooks 20, 21 and, in accordance with FIG. 4, presses the hanger hooks apart and lifts hanger hook 20 over hanger hook 21 so that, as shown in FIG. 10, the hangers come to lie in two courses of threads 1' arranged adjacently on spindle 1.

If a hook strikes directly against tip 12 of a pin 4, 4', 5, 5' and threatens to jam, the respective pin 4, 4', 5, 5' yields to the pressure due to the resilient mounting of its shaft 2a, 2b, 3a, 3b, and the hook slides past the tip.

Referring to FIG. 6, excessively strong swinging movements of hanger 22 are avoided by a housing 25 which surrounds spindle 1. A guide slot 26 in the lower region of housing 25 is left free for the passage of hangers. Any swinging hangers 22 are then quieted by the slot 26.

An alternative development of housing 25 and slot 26 is illustrated in FIG. 13, which shows an alternative embodiment of the invention. Instead of a spindle, a pipe 27 is used as the hollow body in which, similar to the preceding description, five pins are mounted in parallel alongside each other. In the same way as spindle 1, pipe 27 preferably is arranged with a slight slope in the direction of conveyance F so as to assure dependable transportation of the hangers. At the end of the untangling device, a delivery rod 23 can be provided along which the hangers or hanger hooks can slide to further destinations, as shown in FIG. 4.

FIGS. 14 and 15 show a further alternative embodiment of an untangling device according to the present invention. In this case, pins 32, 32a, 33, 33a, and 34, 34a are combined together in pairs. Each of the pairs is arranged around the circumference of a shaft 30 so as to be separated by an angle of 90°. Pins 32, 32a, 33, 33a, 34, 34a are screwed into bolts 31, 31a. Bolts 31, 31a, each of which bears only one pin, rest via compression springs 36 in a hole in shaft 30. In this embodiment, the shaft 30 is not a hollow body but is provided with holes adapted to retain axially-flexible bolts 31, 31a. Pins 32, 32a are clamped in bolts 31, 31a by clamping screws 37.

Pins 32, 32a, 33, 33a, 34, 34a can be bent or straight. The pins are arranged radially spaced apart in such a manner that their longitudinal axis is not aligned along a radius but extends along a line at a distance "b" separated from and parallel to a radius of the shaft. See FIG. 15.

Although the present invention has been described in relation to particular embodiments thereof, many other variations and modifications and other uses will become apparent to those skilled in the art. Accordingly, the present invention is to be limited not by the specific disclosure herein, but only by the appended claims.

What is claimed is:

1. A device for untangling crossed hanger hooks of a conveyed material transported hanging on hangers, the device comprising:

a substantially cylindrical, at least partially hollow body for transporting the hangers hanging on the body by the hanger hooks, the body having a central axis about which the body is rotatable; and a plurality of pins arranged substantially parallel to each other, each pin being resiliently mounted within the body and extending radially out of the body.

2. A device according to claim 1, wherein the pins have a bent tip.

3. A device according to claim 1, wherein the distance between the pins corresponds approximately to a diameter of the hook.

4. A device according to claim 1, wherein the pins are arranged spaced apart axially and radially along the body.

5. A device according to claim 1, wherein each pin is moveable both axially and radially with respect to the body.

6. A device according to claim 1, wherein each of the pins is mounted within the body by an axially flexible bolt.

7. A device according to claim 1, wherein the pins are mounted within the body by being cast in an elastic composition.

8. A device according to claim 1, wherein each pin is arranged so that a central axis of each pin is displaced parallel to and a distance from a radius of the body.

9. A device according to claim 1, further comprising a plurality of hangers with hanger hooks transported on the rotatable body.

10. A device according to claim 1, further comprising a shaft disposed within the body, the shaft being axially displaceable within the body, wherein at least some of the pins are fastened to the shaft.

11. A device according to claim 10, wherein the pins are fastened to the shaft by screws.

12. A device according to claim 1, wherein the body is a spindle.

13. A device according to claim 12, further comprising a shaft, wherein the spindle is engaged with the shaft.

14. A device according to claim 12, wherein the pins are arranged in pairs disposed around the spindle, the pairs being spaced radially apart by 90°.

15. A device according to claim 1, further comprising a plurality of shafts disposed within the body, each of the shafts being axially displaceable within the body.

16. A device according to claim 15, wherein each of the pins is fastened to a separate one of the shafts.

17. A device according to claim 16, wherein at least some of the shafts are hollow.

18. A device according to claim 17, wherein at least one of the shafts is disposed within at least one of the hollow shafts.

19. A device according to claim 16, wherein the pins extend radially out of the body via slots which are disposed along a tangent to an outer surface of the body and at an oblique angle with respect to the central axis of the body.

20. A device according to claim 15, wherein the shafts are arranged symmetrically as mirror images with respect to a radial line through the body.

21. A device according to claim 20, wherein four pins and four shafts are provided, two of the shafts being hollow, with each containing a respective one of the remaining two shafts.

22. A device for untangling crossed hanger hooks of a conveyed material transported hanging on hangers, the device comprising:

a body having a radius, a central axis, and being rotatable around the central axis, for transporting the hangers and around which body the hanger hooks grip;

a plurality of shafts disposed within the body, each shaft being axially displaceable within the body, at least some of the shafts being hollow; and a plurality of pins, each pin being mounted resiliently on one of the shafts within the body and extending radially from the central axis out through the body, each of the pins being arranged substantially parallel to the other.

23. A device according to claim 22, wherein at least one of the shafts is disposed within at least one of the hollow shafts.

24. A device for untangling crossed hanger hooks of a conveyed material transported hanging on hangers, the device comprising:

a substantially-cylindrical body rotatable about a central axis for transporting the hangers and around which body the hanger hooks grip;

at least one shaft disposed within the body, the shaft being axially displaceable within the body; and a plurality of radially-outward directed pins arranged parallel to each other, the pins being resiliently mounted within the body and extending out of the body via slots, at least some of the pins being fastened to the shaft by screws.

25. A device for untangling crossed hanger hooks of a conveyed material transported hanging on hangers, the device comprising:

a body having a radius and being rotatable about a central axis for transporting the hangers, and around which body the hanger hooks grip; and a plurality of radially-outward directed pins arranged parallel to each other, the pins being resiliently mounted within the body and extending out of the body via slots, each of the pins having a bent tip.

26. A device for untangling crossed hanger hooks of a conveyed material transported hanging on hangers, the device comprising:

- a body having a radius, a central axis, and being rotatable around the central axis, for transporting the hangers and around which body the hanger hooks grip;
- at least four shafts disposed within the body, at least two of the shafts being hollow and each containing at least a respective one of the remaining shafts, each shaft being axially displaceable within the body, at least some of the shafts being arranged symmetrically as mirror images with respect to a radial line through the body; and
- at least four pins mounted resiliently on the shafts within the body and extending radially from the central axis out through the body, each of the pins being arranged substantially parallel to the other.

27. A device for untangling crossed hanger hooks of a conveyed material transported hanging on hangers, the device comprising:

- a body having a radius and being rotatable about a central axis for transporting the hangers, and around which body the hanger hooks grip; and
- a plurality of radially-outward directed pins arranged parallel to each other, the pins being resiliently mounted within the body by being cast in an elastic composition and extending out of the body via slots.

* * * * *